Nov. 17, 1936. P. M. LINCOLN Re. 20,172

ELECTRIC METER OF THE THERMAL TYPE

Original Filed Feb. 27, 1933

Inventor.
Paul M. Lincoln
by H. J. Dennison
Atty.

Reissued Nov. 17, 1936 Re. 20,172

UNITED STATES PATENT OFFICE 20,172

ELECTRIC METER OF THE THERMAL TYPE

Paul M. Lincoln, Ithaca, N. Y.

Original No. 1,992,535, dated February 26, 1935, Serial No. 658,741, February 27, 1933. Renewed May 11, 1934. Application for reissue September 18, 1935, Serial No. 41,181

16 Claims. (Cl. 171—270)

The principal objects of this invention are, to devise an electric meter of the thermal type which will be very simple in construction and extremely accurate and dependable, reducing temperature error and power factor error to a negligible quantity.

The principal feature of the invention consists in the novel utilization of the "Bourdon" tube as the moving element, coupled with the use of a liquid heat responsive element having a rising characteristic to compensate for the falling characteristic in the watts vs. temperature rise curve.

A further important feature consists in the novel construction of the "Bourdon" tube and the liquid reservoir whereby the minimum amount of liquid is contained in the tube in order that the temperature of the liquid in the reservoir shall govern the pressure within the tube and further whereby through the utilization of steel tubing hysteresis is reduced to the minimum.

A still further and highly important feature consists in the novel means of obviating radiation and convection losses resulting in temperature error, by effective temperature insulation, preferably utilizing vacuum enclosures for the liquid reservoirs, and still further in the novel arrangement of a thermal shunt between the heating elements.

In the accompanying drawing, Figure 1 is an elevational view of my improved form of "Bourdon" tube heat responsive element.

Figure 1:
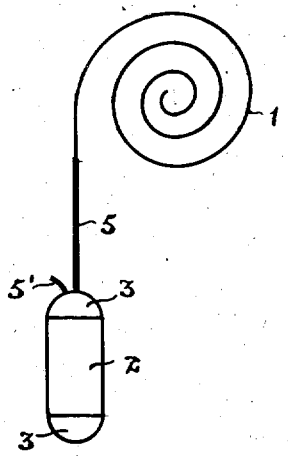

The thermal method of electrical measurement has been effectively demonstrated as a thoroughly practical method and thermal meters are in common use, but it has been recognized that such meters have objectionable features in the form of temperature error due to changes of ambient temperature and power factor error which it is extremely desirable to reduce or eliminate.

The thermal meter which has been in practical use has shown under test a temperature error of the order of .2% per degree C. which error is permissible under the existing "code", but it is recognized that the margin of acceptability of error is not large and it is desirable that a thermal meter should be produced with a lesser temperature error.

According to the "code" a power factor error of 3.0% at certain specified loads and at certain specified power factors is permissible. It is, of course, desirable that this power factor error be reduced to a minimum and the improvements set forth in this application reduce this power factor error to a negligible amount, i. e. to a value much less than the 3.0% permitted in the "code".

In the previous form of the thermal wattmeters the design has been adjusted so that at the maximum 100% power factor load the wattage applied to the hotter element has a suitable value while that applied to the colder element is approximately zero. This condition is secured by means of proper selection of the values of the heater resistances. The differential watts applied to the two resistances is totally independent of the actual value of these resistances so long as they are equal but the watts applied to the colder or hotter element under load does depend on the value of these resistances. It has been found both by analysis and by actual test that better results are obtained under the conditions of load and power factor met in practice when the circulating current is much larger than has been the practice heretofore. This larger circulating current increases the losses in, and temperatures of the elements at no load but results in a much lower temperature of the hotter element when the meter is operating under comparatively large loads at comparatively low power factors. Since it is this maximum temperature attained that dictates the limitation of the meter structure, any steps to reduce this maximum temperature constitute an improvement.

In explanation of this phenomenon, it might be pointed out that the quantity which is measured by any electric wattmeter be it thermal or otherwise is $EI \cos \phi$ where E is the voltage applied, I is the current passing through the meter and $\phi$ is the phase angle between E and I. Heretofore, the design of the thermal meter has been such that at the maximum unity power factor load to be carried by the meter, the amount of heat contributed by the factor E has been approximately equal to that contributed by the factor I. In the new design, the proportion of heat contributed by the factor E has been relatively much increased while the proportion contributed by the factor I has been reduced with the result that the maximum temperature attained by the hotter element under conditions of load and power factor met in practice is very considerably reduced. Or to put the matter in another way, heretofore the design has been such that at maximum unity power factor load the heat contributed by the factor E has been approximately equal to that contributed by the factor I; in the new design, the heats are made approximately equal at the highest load and the lowest power factor that the meter is expected to meet in actual practice. This results in a much lower maximum temperature elevation of the hotter elements than has obtained under the former practice and therefore in a wider margin of safety.

Both from tests and from analysis it has been found that there is a power factor error in the thermal meter as heretofore built and that this power factor error is due almost entirely to the departure of the watts vs. temperature rise curve from a straight line. The increase of the circulating current as herein proposed tends to reduce this power factor error because it reduces the maximum temperature attained by the hotter element under the conditions of large low power factor loads.

Both from tests and analysis it has been found that a given differential wattage application to the two elements of the thermal wattmeter as heretofore built will not result in the same differential temperature but that this differential temperature will depend upon the actual temperature attained. The larger circulating current herein proposed therefore tends to decrease both the temperature error and the power factor error since it decreases the maximum temperature attained by the hotter element of the wattmeter under large low power factor loads.

In the thermal wattmeter as heretofore built it has been found by tests and by analysis that the temperature error is due almost entirely to the fact that a part of the heat has been permitted to escape by radiation. It is well known that the amount of heat that escapes by radiation with a given temperature rise depends on the ambient temperature. It has also been found that the power factor error is due almost entirely to the departure of the temperature rise vs. watts curve from a straight line. This in turn is due to the fact that most of the heat loss is due to natural convection and it is well known that the escape of heat by natural convection is not a first power function.

In the commercially successful type of thermal meter the moving element for effecting meter registration has been the coiled bi-metallic strip and in this type of element practically all the heat is dissipated by convection and radiation from the surfaces of the elements and thermal conduction has but little effect upon the operation.

In the type of element herein disclosed convection and radiation are reduced to practically zero and it is intended that thermal conduction shall be the major feature in the dissipation of the heat. It is therefore important to operate the meter under conditions that will maintain the temperature of the elements as nearly uniform as possible.

In the event of the loss of heat from the electric heaters being almost entirely effected by thermal conduction a first power law is established between temperature difference and heat loss and such a condition is found in the present invention accomplished by the use of vacuum insulation. To this end a much larger circulating current is used in the new "Bourdon" tube type of meter than in the existing bi-metallic strip type.

It has been proposed to utilize tubular moving elements of the "Bourdon" type and such type has been developed to employ a bulb containing a liquid connected with the "Bourdon" tube. In such structures the temperature of the bulb is registered by the "Bourdon" tube.

It has been determined that in order that such type of registration be improved the amount of liquid in the "Bourdon" tube must be reduced to the minimum to ensure that it is the temperature of the liquid in the reservoir that controls the operation of the tube and not the temperature of the tube itself.

According to the present invention the "Bourdon" tube 1, which is essentially a spring, is preferably made of steel which is known to be the best available spring material and such material is practically free from hysteresis; steel is also amenable to heat treatment in order to produce the desirable spring quality.

It has been found in pratice that a steel tube of approximately $\frac{3}{16}$'' outside diameter and having a wall thickness of .010'' may be rolled perfectly flat and after being flattened is wound into spiral form. It is then heat treated to have a yield point of approximately 130,000 lbs. per sq. inch and an elongation of approximately 9% in two inches or such other temper as may be found desirable.

The liquid reservoir 2 connected with the "Bourdon" tube is formed of steel of such dimensions as may be found desirable.

The capillary tube 5, also preferably of steel, connects one end of the reservoir to the "Bourdon" tube and is of suitable dimensions, said tube being secured in the reservoir 2 and in the end of the "Bourdon" tube by suitable means which will ensure permanent freedom from leakage. This may be accomplished by welding or copper brazing in a hydrogen atmosphere or by other methods.

A capillary tube 5' is secured in the end of the reservoir to enable it being filled with the expansile fluid or liquid.

The coiled tubular members are arranged in pairs in opposed relation, that is, with the coils opposed to one another and the ends thereof are secured to the cross member 6 of a common shaft member 7.

The tubes are of course carefully tested and selected so that each tube of a pair shall have identical characteristics in so far as their response to temperature change and torque is concerned.

When thus coupled to a shaft one tube tends to rotate the shaft in one direction and the other in the opposite direction, consequently so long as the two liquid reservoirs remain at an equal temperature the shaft will not rotate, but upon the application of conditions to vary the temperatures between the two liquid reservoirs, the rotation of the shaft will be proportional to the difference in pressures that is developed in the tubes due to a given difference in temperature.

In accordance with the well known principle of thermal meters a differential heat proportional to the watts of the circuit under measurement can be applied to the reservoirs of the "Bourdon" tubes, or an ammeter response may be obtained by heating one of the reservoirs by the current of the load under measurement.

Figure 2:
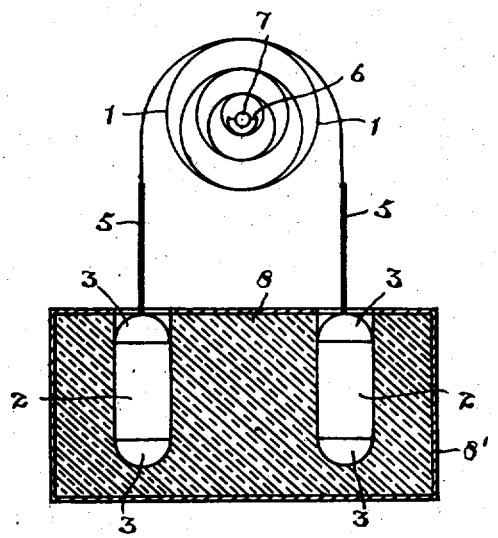
Figure 2 is a diagrammatic sectional illustration of the arrangement of a pair of "Bourdon" tube elements with the reservoirs protected from ambient temperatures by a thermal insulation.

The ideal result to be attained in a meter of this class is that a given differential wattage, applied to the two liquid reservoirs shown in Figure 2, will always give the same angular deflection independent of ambient temperature, power factor, wave form, voltage, frequency, or any other variable that may be applied to the meter.

It has been proven that by using a suitable electrical connection, a differential heat may be obtained proportional to watts and the adoption of the "Bourdon" tube obviates many of the difficulties met with in the bimetallic strip type of meter construction. It is, however, extremely desirable to reduce the variations in the thermal conduction between the reservoirs attached to the "Bourdon" tubes and also to reduce to the minimum the effect of ambient temperature. This may be accomplished by embedding the reservoir 2 within a mass of suitable thermal insulation material 8, which may be enclosed by a metal conductor casing 8', but a more effective insulation may be effected by enclosing the reservoir elements within vacuum casings.

Figure 3:
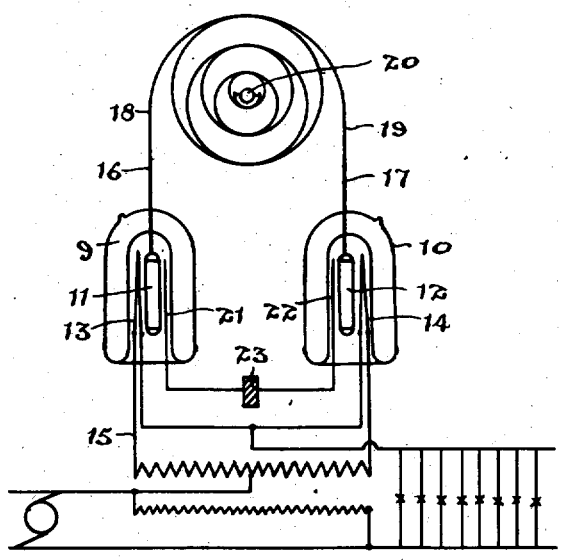
Figure 3 is a diagrammatic illustration of the preferred form of apparatus utilizing vacuum thermal insulation for the liquid reservoirs of the "Bourdon" tube elements.

In Figure 3 of the drawing is illustrated an arrangement of a pair of vacuum receptacles 9 and 10 which are made of desirable proportions to house the liquid reservoirs 11 and 12 respectively, together with the heating elements 13 and 14 arranged in the meter circuit 15, which is of the usual thermal meter type.

The vacuum receptacles 9 and 10 are preferably inverted as illustrated in the diagrammatic showing in Figure 3 and the open ends thereof may be closed to further restrict convection currents if desired.

The vacuum casings may be constructed of glass or of metal, or the inner wall thereof may be of glass and the outer wall of copper, it being well known that copper and glass may be joined with a gas tight seal. The construction of the vacuum bottles is not important so long as they provide good heat insulation.

In order to assist the escape of the heat from within the vacuum casings I provide thermal shunts 21 and 22 which lead out from the casings and are connected to a thermal conductor 23. These thermal shunts provide means for heat to escape by thermal conduction over and above that which must necessarily take place through the leads to the resistances 13 and 14 of Figure 3, and through the capillary tubes 16 and 17 connected with the "Bourdon" tubes 18 and 19 which are oppositely connected to the indicator spindle 20. The thermal shunts 22 and 23 are not essential, but may be used if desired. The escape of the heat from the heater elements is therefore almost entirely by thermal conduction, and therefore follows a first power law with temperature difference between reservoirs 11 and 12.

The vacuum casings are preferably silvered on the inside, thus presenting a heat reflecting surface, and such being arranged within the glass on the vacuum side is permanent.

The use of vacuum heat insulation eliminates almost entirely the curvature in the watts vs. temperature rise relation, and by a careful choice of heat responsive liquid, a condition may be obtained that will result in practically complete compensation. The ideal to be attained is that a given differential wattage applied to the two liquid reservoirs shall always give the same angular deflection independent of ambient temperature, power factor, wave form, voltage, frequency or any other variables that may be applied to the meter and a condition closely approximating this ideal is achieved in this invention. The temperature error in the bi-metallic strip type of meter due to the departure of the watts vs. temperature relation from a straight line is eliminated by making the temperature differential vs. deflection relation bend in one direction by exactly the same amount as the watts vs. temperature relation bends in the other direction.

In the use of thermal insulation of the vacuum type there is practically no change in the loss of heat with changes in ambient temperature, consequently the liquid used will have a straight line response to temperature changes, but when heat insulation of an ordinary type is used, as illustrated in Figure 2, the loss of heat is considerable and the temperature co-efficient is such that the loss of heat rises more rapidly than does the temperature difference. When such insulations are used a liquid will be chosen with a rising characteristic to compensate for the falling characteristic of the thermal conduction of the thermal insulation.

What I claim as my invention is:—

1. In a thermal electric meter a moving element comprising a coiled "Bourdon" tube flattened to present the minimum internal volume, and a liquid reservoir connected in sealed liquid communication with said tube.

2. In a thermal electric meter, a moving element comprising a coiled "Bourdon" tube flattened to present the minimum internal volume, a liquid reservoir, and a capillary tube connecting said reservoir with said tube and pressure sealed.

3. In a thermal electric meter, a moving element comprising a pair of coiled "Bourdon" tubes arranged in opposed relation, an indicator spindle connected on opposing sides to one end of each of said tubes, a liquid reservoir connected with the other end of each of said tubes, and means for thermally insulating said reservoirs.

4. In a thermal electric meter, a moving element comprising a rotatable member, a pair of oppositely coiled "Bourdon" tubes each having one end connected to said rotatable member and arranged in opposed relation, a liquid reservoir connected to the other of each of said tubes, thermal insulating means surrounding each of said reservoirs, heaters arranged in thermal conducting relation to each of said reservoirs, and a thermal conductor arranged adjacent to each of said reservoirs and extending beyond the thermal insulating means to dissipate the heat.

5. In a thermal electric meter, a moving element comprising a rotatable member, a "Bourdon" tube connected therewith, a liquid reservoir connected with said tube, and vacuum means for thermally insulating said reservoir.

6. In a thermal electric meter, a moving element comprising a rotatable member, a "Bourdon" tube connected therewith, a liquid reservoir connected with said tube, and a vacuum tube enclosing said reservoir.

7. In a thermal electric meter, a moving element comprising a rotatable member, a "Bourdon" tube connected therewith, a reservoir connected with said tube, a vacuum tube enclosing said reservoir, and a heater arranged adjacent to said reservoir within said tube.

8. A thermal electric meter comprising a rotatable element, a pair of oppositely coiled "Bourdon" tubular spring members each having one end connected to said rotatable member, a liquid reservoir connected to the opposite end of said tubular member, a vacuum tube enclosing each of said reservoirs, a thermal shunt arranged in each of said tubes and connected together, a thermal conductor connected to said thermal shunts outside of said tubes, and heaters arranged within said vacuum tubes in close thermal arrangement with said reservoirs.

9. In a thermal electric meter, the combination with a "Bourdon" tube and a liquid reservoir connected therewith, of a vacuum tube enclosing said reservoir having its inner wall formed of glass and its outer spaced wall formed of copper, said glass and copper walls being connected by a sealed joint.

10. A thermal electric meter comprising a rotatable member, a pair of coiled "Bourdon" tubes each connected at one end to said rotatable member in opposed relation, liquid reservoirs connected one with each of said "Bourdon" tubes, thermal insulating means enclosing said liquid reservoirs, and a metal thermal conductor enclosing said thermal insulating means.

11. In a thermal electric meter, the combination with a rotatable member, a pair of heat-responsive elements operatively connected with said rotatable member, and electric heaters arranged in close thermal association with said thermally affected member, of a vacuum tube enclosing each of said heaters and the adjacent associated portion of said heat-responsive elements, and a thermal conductor having shunts leading from said vacuum tubes.

12. A thermal electric meter comprising electric heater elements, registering means affected by said heaters, means for conducting heat from said heaters, and means to compel substantially all escape of heat to be effected through said conductors.

13. A thermal electric meter comprising electric heater elements, registering means affected by said heaters, heat conductors leading from said heaters, and vacuum means for insulating said heaters compelling all heat exchange by regulated thermal conduction through said conductors in accordance with a first power law of temperature difference.

14. A thermal electric meter comprising electric heater elements, registering means affected by said heaters, vacuum tubes enclosing said heaters, and conductors leading from said heaters for effecting all heat exchange by adjusted thermal conduction.

15. In a thermal electric meter, the combination with registering means and opposing heat responsive means for operating said registering means and electric heaters associated with said heat responsive means, of means for conducting heat from said heaters, and means associated with each of said heaters to restrict the escape of heat to said conducting means to effect the differential operation of said heat responsive means in relation to the heat applied.

16. A thermal electric meter comprising heat actuated registering means, heat absorbing means attached to said registering means, heaters having values so selected that the heat liberated therein with voltage alone is substantially equal to the heat liberated therein with a maximum current alone, and means for compelling the heat escape to be mainly by conduction.

PAUL M. LINCOLN.